Patented Aug. 13, 1940

2,210,945

UNITED STATES PATENT OFFICE 2,210,945

DUSTING COMPOSITION

Lindley E. Mills, Midland, Mich., assignor to The Dow Chemical Company, Midland, Mich., a corporation of Michigan No Drawing. Application May 20, 1940, Serial No. 336,237

6 Claims. (Cl. 167—31)

This invention concerns dust compositions adapted to be employed for the control of insect and mite pests on trees and plants.

The dinitro-cresols and their salts are toxic to a number of common insects. Low concentrations of these compounds may be applied under carefully controlled conditions for pest control, but by reason of mechanical difficulties encountered in their application, their toxicity to humans, and their tendency to injure living vegetation on contact therewith, they have not been widely used for insecticidal purposes. To overcome the above disadvantages, solutions of the dinitro-cresols in petroleum oil have been employed, which compositions are capable of exerting a synergistic insecticidal effect upon a number of insect species when contacted therewith through the medium of oil-water emulsions. Such oily insecticidal products can be advantageously employed in certain phases of insect control on deciduous plants, but are not adapted to resolve problems of pest control on non-deciduous plants and particularly such tropical and subtropical groups as citrus, and the like. While the use of insecticidal oil compositions on the latter frequently provides commercial control for certain common pests, continued application of oil has been found to seriously interfere with the normal development and life cycle of plants and to be accompanied by a depression of plant metabolism and other undesirable physiological disturbances.

In an effort to obtain uniform distribution of dusts, phenolic and other synthetic organic insecticidal materials have been combined with various carriers and solid diluents. In many cases, the carriers hitherto commonly used are unsuitable or disadvantageous and a more satisfactory carrier agent is desired. The various mineral dusts and powders such bentonite, diatomaceous earth, talc, lime, etc., are acted upon by phenolic insecticides and particularly dinitro-cresols, thereby reducing the effectiveness of the latter and forming other compounds frequently toxic to foliage which are so soluble as to be rapidly leached out of dust deposits by water. For example, in mixtures comprising the mineral dusts and dinitro-cresol, the cresol compound reacts to form alkali metal and alkaline earth metal phenolates which are much more water-soluble and toxic to growing plants than the dinitrocresol itself. The use of sawdust, bran, flour meal, and coarsely ground wood products as carriers for insecticides has been considered but has met with little practical application due to the difficulty encountered in obtaining and maintaining a homogeneous dispersion of the insecticide toxicant through such carriers, problems of application inherent to such composition, and the failure of such roughly comminuted products to adhere to infested plant surfaces.

I have discovered that those ligno-cellulosic materials which have acid buffering properties are substantially non-reactive with dinitrophenols having the formula

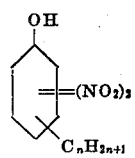

wherein $n$ is an integer not greater than 2. When small amounts of the latter are intimately dispersed through, incorporated with, adsorbed on, or absorbed in an excess of such a ligno-cellulosic material in finely-divided form, insecticidal compositions are obtained which are not subject to the disadvantages outlined above. These dust compositions can be safely applied to the foliage of both citrus and deciduous plant species, stick well to plant surfaces, and give a superior control of insect and mite pests without causing permanent injury to, or undesirable physiological disturbances in, the plant host. These compositions may be conveniently handled in conventional dusting apparatus to give uniform coverage of pest-infested tree or plant surfaces, and display properties of residual toxicity not generally inherent to related dusting materials.

The ligno-cellulosic carrier may be, for example, finely-divided woody material such nutshells, pits of stone fruits, husks, bark, wood, and the like. Many of these and related plant products have been found to have acid buffering properties, to have little or no independent insecticidal activity, and to be innocuous to both plants and humans. The ligno-cellulosic carrier preferably should have a particle size smaller than 100 screen mesh. Coarser material is unsatisfactory as a carrier for a number of reasons, among which are (1) that it is practically impossible to obtain and maintain a homogeneous dispersion of insecticidal toxicant through the diluent by the usual mixing methods; (2) compositions comprising coarse diluents cannot be readily dusted in conventional apparatus due to the mass and weight of the particles therein and their tendency to plug the exit openings and mechanism of such apparatus; (3) a uniform dust deposit cannot be obtained on the tree surfaces because of the failure of the larger dust particles to adhere to the tree surfaces; (4) many of the particles in the mixture are too large to be ingested by insect and mite pests, and particularly chewing insects; (5) the adhesion of such particles is so poor as to render the compositions of relatively little value as contact insecticides; (6) each large particle of the carrier contains a relatively large amount of toxicant, and where such a particle rests on fruit or foliage there is appreciable tendency for injury to occur; and (7) large particles of dust applied with modern equipment tend to injure tender fruit and bloom due to the force of impact, it being possible with sharp, hard particles to drive the composition into the skin of the fruit. While ligno-cellulosic material smaller than 100 screen mesh is suitable, material smaller than about 300 screen mesh has been found particularly satisfactory. The finely-divided acid buffering ligno-cellulosic carriers will hereinafter be referred to as "ligno-cellulosic flour."

According to the invention, a small proportion of a dinitro-cresol or dinitro-ethyl-phenol is intimately mixed with a ligno-cellulosic flour which has the characteristic of buffering aqueous disperson to an acid pH. This mixing may be accomplished in any suitable manner to secure a thorough dispersion of the nitro compound with the carrier. For example, the phenol may be ground with the ligno-cellulosic flour to produce a product of suitable particle size. A further means for incorporating the phenolic compound into the ligno-cellulosic flour consists in dissolving the toxicant in a volatile organic solvent, moistening and mixing the carrier with the resultant solution, and subsequently evaporating the solvent from the mixture. The product obtained as above is adapted for insecticidal or arachnidicidal dusting without further treatment.

The proportion of dinitro-phenolic compound preferably incorporated with the ligno-cellulosic flour is generally between about 0.25 and 2.0 per cent by weight thereof, depending upon the particular insect or mite pest for which the composition is to be applied, the tolerance of the tree species for the dinitro compound, and the amount of the composition to be applied to the individual tree. For application to citrus trees, concentrations of from approximately 0.5 to 1.5 per cent by weight of the toxicant in the composition have been found to give satisfactory pest control and to be substantially non-injurious. While nitrophenol compounds generally, and particularly certain dinitro-cresol compounds heretofore suggested as insecticides, have been found to have a high toxicity to animals and humans and to be corrosive to living tissue, the dinitro-cresols and dinitro-ethyl-phenols in the compositions above described are relatively innocuous in the amounts employed, thereby substantially eliminating danger to operators during their handling and minimizing the problem of residue removal from fruit dusted therewith.

The compositions may be further modified by the inclusion therein of various wetting, spreading, acidizing, and buffering agents, although the addition of an excess of alkaline material is not recommended lest the tendency shown by many of the ligno-cellulosic flours to acidify and buffer the composition to an acid pH be vitiated.

The following examples set forth certain modes in which my invention may be carried out and illustrate certain aspects thereof, but are not to be construed as limiting the invention:

*Example 1*

An insecticidal dusting composition of smaller particle size than 250 screen mesh was prepared by grinding 1 pound of 2.4-dinitro-ortho-cresol with 99 pounds of walnut shell flour. This composition was dusted on orange trees of the navel variety in amount equivalent to 1 pound of the dust mixture per tree and effected a substantially complete kill of citrus red mites thereon. No burning or other injury directly attributable to the dust application was observed. Undusted control trees continued to be infested with red mite and eventually showed serious foliage and fruit injury therefrom. The dust was found to have residual toxic action and 7 days after application inspection of the dusted trees showed them to be substantialy free of red mite infestation. The dust deposit adhered well to the bark, leaves, and fruit of the trees and was uniformly deposited on the tree surfaces.

*Example 2*

1 pound of 2.4-dinitro-6-ethyl phenol was dissolved in 2000 milliliters of toluene and 99 pounds of finely-divided walnut shell flour of from 300 to 400 screen mesh particle size moistened therewith. This composition was thoroughly mixed and the toluene subsequently evaporated therefrom, leaving the 2.4-dinitro-6-ethyl phenol adsorbed on the carrier. The resulting dust product did not tend to form agglomerates and was found adapted for use in common dusting apparatus. This composition was dusted on orange trees of the navel and Valencia varieties in the amount of 1 pound of the dust mixture per tree. A substantially complete initial kill of both immature and adult spiders was thereby accomplished. The mites which hatched over a considerable period following the dusting were also controlled, inspection of the grove after 7 days indicating that the percentage control of mite population remained in excess of 90 per cent. No burning or other injury directly attributable to the application was observed. The dust adhered well to the bark, leaves, and fruit of the trees and was evenly deposited over the exposed surfaces.

*Example 3*

In a similar manner 1 pound of the 2.4-dinitro-6-ethyl phenol was dissolved in toluene and incorporated with 99 pounds of redwood bark flour of from 250 to 400 screen mesh particle size. The toluene was removed from the composition by evaporation and the composition dusted on navel orange trees at 1 pound per tree. 7 days after application no live adult mites were found on 6 of the dusted trees, and on 8 other trees only an occasional living mite was in evidence. In addition to the control of red mite, the application of the dust also controlled infestation of thrips, pacific mite, yellow mite, and orange tortrix. It was also found that the black scale population was materially reduced by the treatment. No burning or other commercial injury resulted from the application. For the control of heavy mite infestation on Valencia oranges, an amount of the composition between 1½ and 2 pounds per tree is required.

In a similar manner, the above compositions may be applied to the foliage of walnut, apricot, fig, avocado, lemon, grapefruit, apple, peach, and cherry trees for the control of such pests as pacific mite, yellow mite, yellow-striped army worm, bean thrips, flower thrips, black scale, citricola scale, orange tortrix, six-spotted mite, codling moth larva, red spider, walnut husk fly, and the like.

The walnut shell flour employed in the above examples consisted of fine yellow-brown flakes having a particle size smaller than 100 screen mesh and for the most part smaller than 300 screen mesh, contained from 1 to 2 per cent by weight of water-soluble material, and tended to acidify and buffer water to a pH of between 4.5 and 5.5. It had no independent toxicity to insects or mites and was innocuous to both plants and humans. The redwood bark flour consisted of red transparent flakes of smaller particle size than 100 screen mesh and for the most part smaller than 250 screen mesh. This material was non-reactive with the dinitro-cresols and dinitro-ethyl-phenols, innocuous to plants and humans, had a slight repellent effect on insects, and tended to acidify and buffer to a pH of between about 3 and 5 when in aqueous suspension. Redwood wood flour consists essentially of cellulose and lignin. It is substantially insoluble in water, non-reactive with phenols under the conditions of operation, and when wet with water or in aqueous suspension exerts an acidifying and buffering action to a pH of between approximately 3 and 5.

Other dinitro-cresols and dinitro-ethyl-phenols which may be employed in a manner similar to that described in the above examples are 2.6-dinitro-para-cresol, 2.5-dinitro-para-cresol, 2.5-dinitro-ortho-cresol, 2.6-dinitro-meta-cresol (2.4-dinitro-5-methyl-phenol), 2.6 - dinitro-4-ethyl-phenol, 2.4-dinitro-5-ethyl-phenol, etc. Other ligno-cellulosic flours which I have found to have an acid buffering action and to be suitable for use as carriers include those prepared from coconut shells, pecan shells, Brazil nut shells, peach pits, cherry pits, apricot pits, olive pits, plum pits, cedar wood and bark, birch, and similar products. Representative compositions which may be employed as insecticidal and arachnidicidal dusts substantially as described in the foregoing examples are the following:

Composition 1

| | Per cent by weight |
|---|---|
| 2.6-dinitro-para-cresol | 2 |
| Coconut shell flour | 98 |

Composition 2

| | |
|---|---|
| 2.4-dinitro-meta-cresol | 0.5 |
| Peach pit flour | 99.5 |

Composition 3

| | |
|---|---|
| 2.6-dinitro-4-ethyl-phenol | 1.5 |
| Birch wood flour | 98.5 |

Composition 4

| | |
|---|---|
| 2.4-dinitro-ortho-cresol | 1 |
| 2.4-dinitro-meta-cresol (2.4-dinitro-5-methyl-phenol) | 1 |
| Brazil nut shell flour | 98 |

Composition 5

| | |
|---|---|
| Nitrated mixed cresylic acid fraction containing two nitro groups per molecule by analysis | 1 |
| Redwood wood flour | 99 |

Composition 6

| | |
|---|---|
| Nitrated mixture of isomeric ethyl-phenols containing an average of two nitro groups per molecule | 1 |
| Cedar wood flour | 99 |

The above compositions may be employed for the control of insect and mite pests generally on deciduous and citrus fruit trees, ornamentals, flowers, and other plants.

The present application is a continuation-in-part of my copending application Serial No. 214,573, filed June 18, 1938.

Other modes of applying the principle of my invention may be employed instead of those explained, change being made as regards the materials or amounts thereof employed, provided the products claimed in the following claims be thereby obtained.

I therefore particularly point out and distinctly claim as my invention:

1. An insecticidal composition adapted to be used on growing plants comprising a ligno-cellulosic flour of smaller particle size than 100 screen mesh which has acid buffering properties, and intimately incorporated therewith a dinitro-phenol having the formula

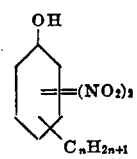

wherein $n$ is an integer not greater than 2.

2. An insecticidal dust comprising as a major constituent a ligno-cellulosic flour of smaller particle size than 100 screen mesh which has acid buffering properties, and intimately incorporated therewith a relatively small amount of a dinitro-cresol.

3. An insecticidal dust comprising as a major constituent walnut shell flour of smaller particle size than 100 screen mesh and intimately incorporated therewith a relatively small amount of a dinitro-phenol having the formula

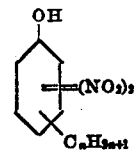

wherein $n$ is in integer not greater than 2.

4. An insecticidal dust comprising as a major constituent a redwood flour of smaller particle size than 100 screen mesh and intimately incorporated therewith a relatively small amount of a dinitro-phenol having the formula

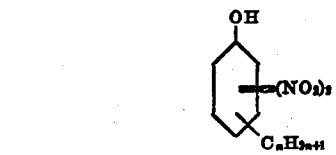

wherein $n$ is an integer not greater than 2.

5. An insecticidal dust comprising as a major constituent walnut shell flour of smaller particle size than 100 screen mesh and a relatively small amount of a dinitro-cresol intimately incorporated therewith.

6. An insecticidal dust comprising as a major constituent walnut shell flour of smaller particle size than 100 screen mesh and a relatively small amount of 2.4-dinitro-ortho-cresol intimately incorporated therewith.

LINDLEY E. MILLS.